L. Bailey,
Bench Plane.

No. 67,398.          Patented Aug. 6, 1867.

Witnesses.
Samuel N. Piper
Geo. H. Andrews.

Inventor:
Leonard Bailey.
by his Attorney
R. H. Eddy

United States Patent Office.

LEONARD BAILEY OF BOSTON, MASSACHUSETTS.

*Letters Patent No. 67,398, dated August 6, 1867.*

---

IMPROVEMENT IN BENCH-PLANES

---

*The Schedule referred to in these Letters Patent and making part of the same.*

---

TO ALL PERSONS TO WHOM THESE PRESENTS SHALL COME:

Be it known that I, LEONARD BAILEY, of Boston, in the county of Suffolk, and State of Massachusetts, have invented a new and useful Improvement in Joiners' Planes; and I do hereby declare the same to be fully described in the following specification, and represented in the accompanying drawings, of which—

Figure 1:
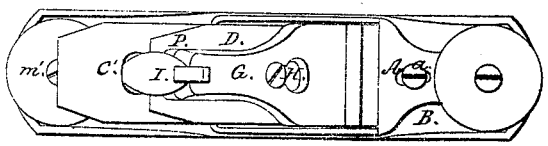

Figure 1 is a top view.

Figure 2:
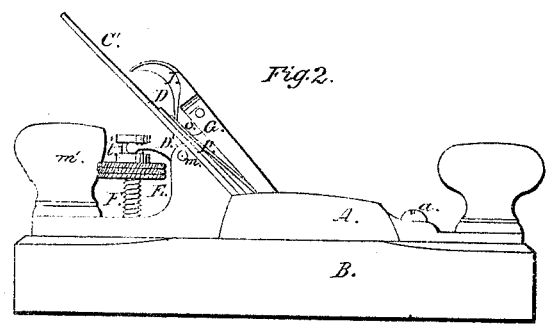

Figure 2, a side elevation, and

Figure 3:
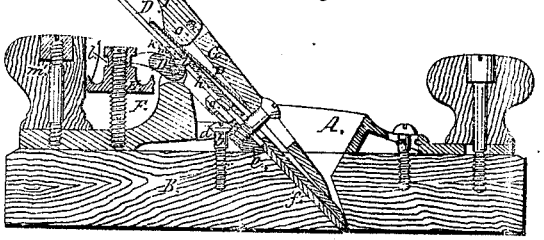

Figure 3 a longitudinal section of a plane provided with my invention.

Figure 4:

The stock of the plane I construct in two parts, A B, the throat C for the reception of the plane-iron being formed in both of them in manner as represented. The lower portion B of the stock I make of wood, and the upper portion A of iron or metal, each being formed in manner as represented in the drawings. The portion A is placed on the top of the part B, and they are connected by clamp-screws $a$ $b$ going down through slots $c$ $d$ made in the part A, the same being so as to enable the part A to be moved a little lengthwise or adjusted on the part B, as occasion may require, in order to bring the plane-iron supporting-face $e$ of such part A flush or even with the upper surface of a thin plate when glued or fixed to the plane-iron or supporting-face $f$ of the part B. As the lower surface of the part B may become worn away, from use of the plane, the opening of the lower part of the throat will grow wider, and finally become so wide as to render it necessary to glue, or fix on the back or inclined face of that part of the throat which is on the part B, a thin layer or plate of wood or other material of sufficient thickness to bring the plane-iron in its true relation with the front edge of the opening of the throat. The advantage of applying the parts A and B to each other in manner or so as to enable the part A to be moved and adjusted on the part B will thus be apparent. The plane-iron is represented at C' as provided with a cap-iron, D, which is fastened to the plane-iron by means of a clamp-screw, $g$, which goes through a slot, $h$, made lengthwise in the plane-iron and screws into the cap-iron. The cap-iron, near its upper end or heel, and directly over the slot $h$, I form with a hole or slot, $k$, to receive the shorter arm $l$ of a forked lever, D', which, with its fulcrum $m$, is arranged in the part A in manner as represented. The said forked lever is shown in top view in Figure 4, its shorter arm being arranged at or about at a right angle with its longer or furcated arm. The two prongs of the forked arms embrace the shank of a nut, E, and enter a groove, $l'$, made in and around the shank. This nut is screwed on a vertical male screw, F, extending up from the part A and near to its rear handle $m'$, in manner as shown in the drawings. The object of the said nut and furcated lever, as arranged and applied to the part A or the plane-stock, and the cap of the plane-iron, as explained and represented, is to enable a person to move the said plane-iron lengthwise in order to properly adjust its cutting-edge with reference to the bottom surface of the plane-stock. Were the hole $k$ in the plane-iron instead of in the cap-iron, the plane-iron, as it might become worn up by the process of sharpening it, would require a new hole or series of holes in it to render it available, but by having the hole $k$ in the cap-iron, such hole not only serves, with the shorter arm of the lever D, as a means of readily attaining the proper position of the plane-iron and its cap-iron in the stock, but enables the plane-iron to be adjusted by the action of the lever and the nut and screw, and to be adjusted on the cap-iron, as occasion may require, after a sharpening of the plane may have taken place. In order to aid in depressing the heel of the fastening bearer or lever G from the head of the screw H, as well as to afford a means of aiding in throwing up the cam-lever I, and to enable the cam $o$ of such lever to turn without friction on the cap-iron, I affix to the bearer, on its under side, a spring plate, $p$, it being arranged with the bearer and its lever I in manner as represented.

What I claim as my invention in the above-described joiner's plane is as follows:

I claim the arrangement of the two parts A B of the stock together, and with slots $c$ $d$ and clamp-screws $a$ $b$, as described, whereby such parts may be adjusted with reference to each and clamped together as and for the purpose specified.

I also claim the combination as well as the arrangement of the adjusting screw F and nut E, or the equivalent thereof, and the bent lever, with the plane-stock.

Also, the arrangement of the hole $k$ in the cap-iron to operate with the adjusting lever, combined with the screw and nut, or the equivalent thereof, and applied to the stock, as set forth.

LEONARD BAILEY.

Witnesses:
  R. H. EDDY,
  GEO. H. ANDREWS.